United States Patent
Mukherjee et al.

(10) Patent No.: US 7,053,688 B2
(45) Date of Patent: May 30, 2006

(54) CONSTRAINED COEFFICIENT ADAPTATION FOR CONTINUOUS-TIME EQUALIZERS

(75) Inventors: Debanjan Mukherjee, San Jose, CA (US); Jishnu Bhattacharjee, San Jose, CA (US); Abhijit Phanse, Sunnyvale, CA (US)

(73) Assignee: Scintera Networks, Inc., San Jose, CA (US)

( * ) Notice: Subject to any disclaimer, the term of this patent is extended or adjusted under 35 U.S.C. 154(b) by 23 days.

(21) Appl. No.: 10/970,471

(22) Filed: Oct. 20, 2004

(65) Prior Publication Data
US 2006/0082406 A1   Apr. 20, 2006

(51) Int. Cl.
*G06G 7/16* (2006.01)
(52) U.S. Cl. ............................. 327/359; 327/361
(58) Field of Classification Search ............... 327/355, 327/356, 359, 361
See application file for complete search history.

(56) References Cited

U.S. PATENT DOCUMENTS 6,690,236 B1 *  2/2004  Saito ..................... 330/254

* cited by examiner

*Primary Examiner*—Kenneth B. Wells
(74) *Attorney, Agent, or Firm*—Jonathan W. Hallman; MacPherson Kwok Chen & Heid LLP

(57) ABSTRACT

A low-voltage constrained coefficient adaptation and multiplication is provided. To provide the constrained coefficient adaptation, an adder adds an adaptive differential control voltage to a forcing differential control voltage to provide an effective coefficient. The adder is configured such that the forcing differential control voltage can prevent the adaptive differential control voltage from producing a sign change in the effective coefficient.

21 Claims, 3 Drawing Sheets

_US 7,053,688 B2_

CONSTRAINED COEFFICIENT ADAPTATION FOR CONTINUOUS-TIME EQUALIZERS

FIELD OF INVENTION

This invention relates generally to continuous-time equalizers, and more particularly to the constrained coefficient adaptation for such equalizers.

BACKGROUND

Intersymbol interference (ISI) is a hindrance to high-speed digital communication. Effective digital communication depends on a sharp transition between data pulses whereas pulse transitions "smear" into each other in communication channels having ISI, a phenomenon denoted as pulse dispersion. Pulse dispersion occurs because high-frequency components of the data pulses are attenuated by the transmission medium. At higher data rates, the interference can become such that data pulses cannot be accurately distinguished from one another, leading to unacceptably high error rates.

Equalizers combat pulse dispersion by partially canceling the high-frequency cutoff that occurs in the transmission medium. A feedforward equalizer performs this mitigation of ISI using a combination of signal samples. In contrast, a feedback equalizer mitigates ISI based upon a combination of past output decisions. A decision feedback equalizer (DFE) is a combination of both a feedforward and a feedback equalizer and typically provides greater ISI mitigation then either technique alone. FIG. 1 illustrates an exemplary DFE 10, which includes a feedforward equalizer portion 105 and a feedback equalizer portion 110 to equalize an input signal s(t). A slicer 115 operates on the combined outputs from equalizer portions 105 and 110 to output a current digital decision 120. The number of taps in equalizer portions 105 and 110 is arbitrary and is denoted as n and m, respectively.

It will be appreciated that a feedback loop (not illustrated) is required to control the adaptation of the coefficients employed in the taps. For example, the input signal to slicer 115 may be sampled and compared to delayed versions of the slicer input signal to generate an error signal. The coefficients, which may be represented by a vector C, are then adapted responsive to the correlation between the error signal and the corresponding signal samples. However, a problem arises in that for a blind-adaptive equalizer having feedforward taps, coefficient vectors C and −C are equally valid. Thus, the coefficients have a natural tendency to be flipped leading to a polarity inversion of the output. In other words, the feedback loop for the adaptation is such that what should be binary ones at the output of slicer 110 become binary zeroes, and vice versa.

Accordingly, there is a need in the art for equalizers having constrained coefficient adaptation.

SUMMARY

In accordance with one aspect of the invention, a constrained coefficient adder for adding an adaptive differential control voltage and a forcing differential control voltage is provided. The adder includes: a first diode-connected transistor conducting current from a first node; a second diode-connected transistor conducting current from a second node; a first differential transistor pair, wherein current steering within the first differential pair of the current from the first current source is responsive to the adaptive differential control voltage; and a second differential pair, wherein current steering within the second differential pair of the current from the second current source is responsive to the forcing differential control voltage, and wherein the current steered by a first transistor in each of the first and second differential pairs is supplied by the first node, and wherein the current steered by a second transistor in each of the first and second differential pairs is supplied by the second node such that if the forcing differential control voltage steers all the current to either of the first or second transistors in the second differential pair, a current difference between the current conducted by the first and second diode-connected transistors cannot change sign responsive to changes in the adaptive differential control voltage, the current difference representing the addition of the adaptive differential control voltage and the forcing differential control voltage.

In accordance with another aspect of the invention, a method for adding an adaptive differential control voltage and a forcing differential control voltage is provided. The method includes the acts of: providing a first current to a first node; providing a second current to a second node; steering current from either the first node or the second node responsive to the adaptive differential control voltage, wherein if the adaptive differential control voltage is positive, current is steered from the first node and if the adaptive differential control voltage is negative, current is steered from the second node; steering current from either the first node or the second node responsive to the forcing differential control voltage, wherein if the forcing differential control voltage is positive, current is steered from the first node and if the forcing differential control voltage is negative, current is steered from the second node; conducting current that has not been steered from the first node through a first-diode connected transistor; and conducting current that has not been steered from the second node through a second diode-connected transistor, wherein a difference between the currents through the first and second diode-connected transistors represents the addition of the differential control voltages.

DETAILED DESCRIPTION

Figure 1:
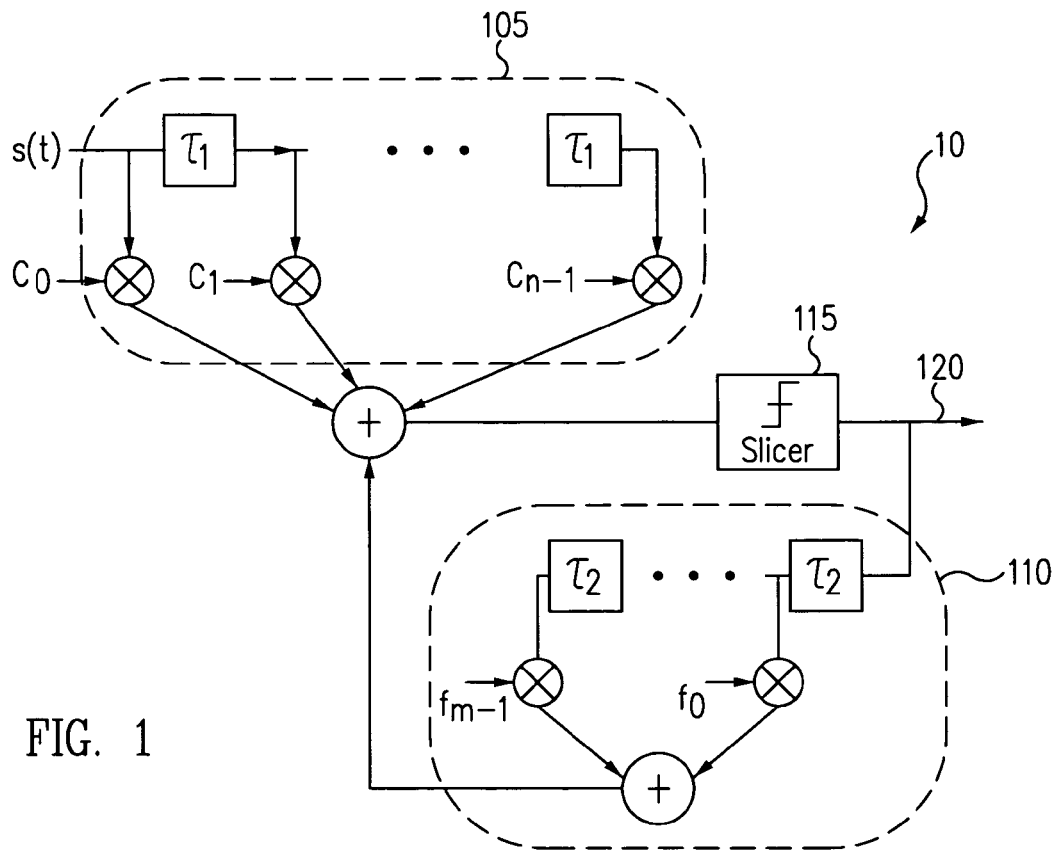
FIG. 1 is a block diagram of a conventional decision feedback equalizer.

The present invention may be used for the constrained coefficient adaptation for any continuous-time equalizer. For example, referring again to FIG. 1, the constrained coefficient adaptation described herein may be used to adapt the coefficients in either or both of feedforward equalizer portion 105 and a feedback equalizer portion 110. Turning now to FIG. 2, a simplified block diagram of an adder 200 for providing a constrained coefficient 205 is shown. Constrained coefficient 205 may also be denoted as an effective coefficient. A conventional adaptive feedback loop (not illustrated) provides an analog adaptive coefficient vc 210. Similarly, a digital-to-analog converter (not illustrated) provides an analog forcing coefficient vdac 215. Adaptive coefficient vc 210 may couple through a switch 220 to adder 200 whereas forcing coefficient vdac 215 couples through a switch 225 to adder 200. Thus, depending upon the configuration of switches 220 and 225, constrained coefficient 205 may equal adaptive coefficient vc 210, forcing coefficient vdac 215, or a summation of these two signals. Operation of adder 200 is such that, on a normalized basis, all the signals vc 210, vdac 215, and constrained coefficient 210 will be constrained within the range [−1,1]. Referring back to FIG. 1, constrained coefficient 205 would then used to multiply input signal s(t) at one or more of the taps for either feedforward equalizer portion 105 or feedback equalizer portion 110.

Figure 3:
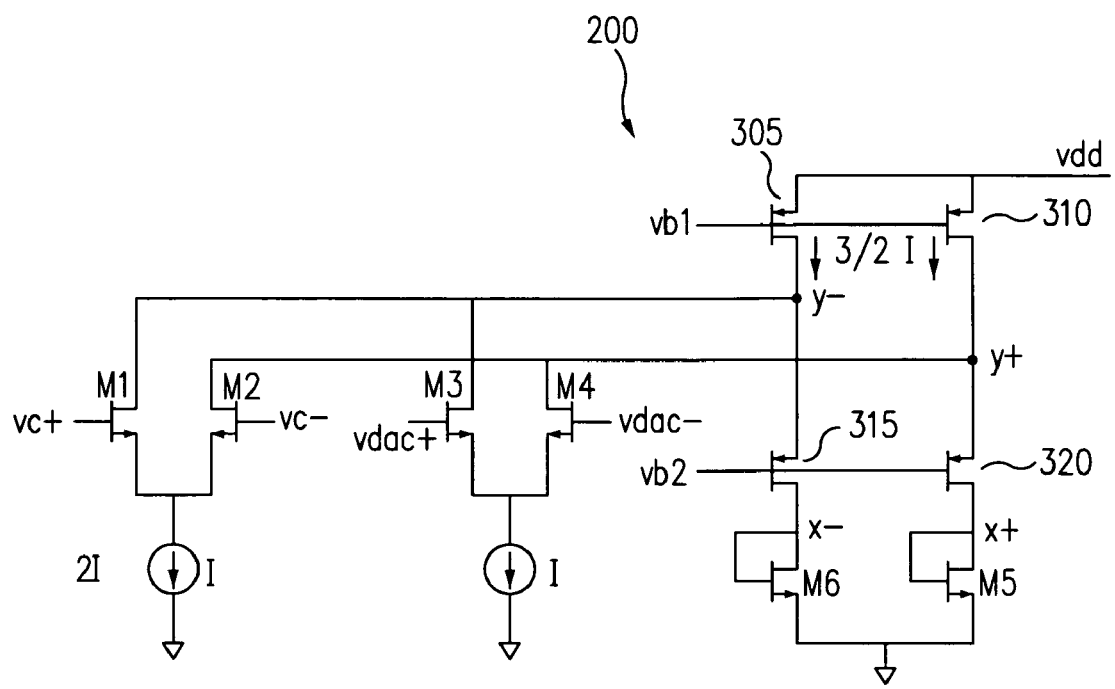
FIG. 3 is a schematic diagram of an exemplary embodiment for the adder of FIG. 2.

Turning now to FIG. 3, a schematic illustration for adder 200 is shown. Both adaptive coefficient vc and forcing coefficient vdac are in differential form. Thus, vc is represented by the difference between a signal vc+ and vc− whereas vdac is represented by the difference between a signal vdac+ and vdac−. Differential signals vc+ and vc− control the gates of a differential pair of n-channel MOSFETs M1 and M2. Similarly, differential signals vdac+ and vdac− control the gates of a differential pair of MOSFETs M3 and M4. The sources of M1 and M2 couple to a current source of value I. In analogous fashion, the sources of M3 and M4 couple to a current source of value I. It will be appreciated, however, that the current sources may be of different values. Indeed, by properly adjusting the relative values of the current sources, the contribution from the adaptive coefficient and the forcing coefficient may be adjusted accordingly. The drains of M2 and M4 couple to an output node y+whereas the drains of M1 and M3 couple to an output node y−. Matched p-channel MOSFETs 305 and 310 couple between nodes y− and y+, respectively, and a power supply voltage Vdd. A bias voltage Vb1 controls the gates of MOSFETS 305 and 310 to maintain a desired current flow through each MOSFET 305 and 310. For example, MOSFETS 305 and 310 may be biased such that each transistor conducts as current of 3/2*I.

Operation of adder 200 may be better understood with respect to the common mode default values for both vc and vdac. In one embodiment, should the differential voltage between vc+ and vc− be zero, a current of I/2 will flow through both M1 and M2. Similarly, should the differential voltage between vdac+ and vdac− be zero, a current of I/2 will flow though both M3 and M4. Accordingly, both nodes y+ and y− supply a current of I to the differential pairs in the default state. Suppose, however, that vc+ is greater than vc− by several multiples of the overdrive voltage (Vgs−Vt) for transistors M1 and M2. M1 will then conduct a current of I whereas M2 conducts no current. At this point, the response of the differential pair formed by M1 and M2 is saturated in that further increases between vc+ and vc− have no effect. Similarly, if vc− is greater than vc+ by several multiples of the overdrive voltage, M2 will conduct current I whereas M1 conducts no current. In this fashion, the response of adder 200 to the differential control voltage vc may be treated as if it were normalized within the range of [−1, 1], where −1 corresponds to the case where M2 conducts I and 1 corresponds to the case where M1 conducts I. Consider the case of vc equaling "1." If transistors M3 and M4 are still biased in the default state, node y− must supply a current of I to transistor M1 and a current of I/2 to transistor M3. However, node y+need only supply I/2 to M4 since M2 is non-conducting. But the currents through transistors 305 and 310 are unchanged so long as transistors 305 and 310 are biased to conduct a current of at least 3/2*I.

This change in the current drawn from nodes y+ and y− will affect the current entering a pair of p-channel MOSFET transistors 315 and 320 whose sources are coupled to nodes y− and y+, respectively. The drains of transistors 315 and 320 couple to a pair of nodes x− and x+, respectively. If vc and vdac are such that M1 conducts I while M3 and M4 each conducts a current of I/2, the current flowing through node x− will be zero, assuming that transistor 305 is biased to conduct a current of 3/2*I. However, the current through node x+ will then equal I. As will be explained further herein, the current difference between nodes x+ and x− acts as the effective coefficient produced by adder 200 as discussed with respect to FIG. 2. Conversely, if vc is changed such that M2 conducts I while M3 and M4 each conducts a current of I/2, the current through node x+ will be zero whereas node x− conducts a current of I. It may thus be seen that the current difference between nodes x+ and x− may range from I to −I with vdac in its default value. Note, however, the change if vdac is set to "1" such that M3 conducts a current of I whereas M4 is non-conductive. With vc at its default state of "0" (no differential voltage between vc+ and vc−), the current through node x− will be zero whereas the current through node x+ will equal I. Should vc then change to "1," the current from node y− will be split between M1 and M3. The current through nodes x− and x+ will still be zero and I, respectively, for such a condition. However, if vc changes to −1, the currents through nodes x+ and x− will equal I/2, respectively. Thus, with vdac equaling 1, the current difference between nodes x+ and x− will range from I to 0, not from I to −I as can occur with vdac in its default state. Because the current difference between nodes x+ and x− cannot change sign when vdac is set to "1" the adaptation of vc is constrained such that the bit decisions made by slicer 115 (FIG. 1) will not suddenly change polarity. In other words, by introducing this constraint on the coefficients for feedforward equalizer portion 105, a bit decision by slicer 115 that should be a binary 1 will not be declared a binary 0 and vice versa. In this fashion, vdac acts to constrain the effective coefficient, namely the difference in current between nodes x+ and x−. A similar effect may be seen if vdac is set to −1 such that M4 conducts I and M3 is non-conductive. In this case, the effective coefficient will range from −1 to 0 but cannot change sign. It will thus be appreciated that setting vdac to either 1 or −1 will constrain the effective coefficient produced by adder 200, thereby preventing the output polarity flip discussed resulting previously.

Figure 4:
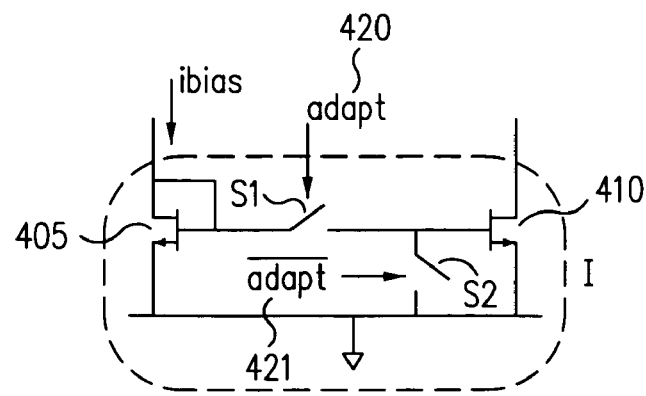
FIG. 4 is a high-level schematic for a first current source in the adder of FIG. 3.

To provide greater feedback flexibility, the current source I coupled to the sources of M1 and M2 may be configured as shown in FIG. 4. Matched n-channel MOSFETS 405 and 410 are arranged into a current mirror configuration. Thus, MOSFET 405 is diode-connected and the gate of MOSFET 410 may receive the gate/drain voltage from MOSFET 405. However, this gate/drain voltage is only received by MOSFET 410 if a switch S1 is closed. Switch S1, which may be implemented using a pass transistor or transmission gate, closes in response to the assertion of an adapt signal 420. Because MOSFET 405 is biased to conduct a current of I, MOSFET 410 will also conduct I when adapt signal 420 is asserted. The drain of MOSFET 410 couples to the sources of transistors M1 and M2 so that they are biased by current source I when the adapt signal 420 is asserted. However, if adapt signal 420 is not asserted, its complement signal 421 will be asserted. Complement signal 421 controls the operation of a switch S2, which may also be implemented using a pass transistor or a transmission gate. When complement signal 421 is asserted, switch S2 closes and thus grounds the gate of MOSFET 410, thereby shutting down current source I. Complement signal 421 may be asserted during periods when no adaptive equalization is necessary, thereby saving power. However, should, for example, the channel become time varying, adapt signal 420 may be asserted so that the effective coefficient may adapt appropriately from closed loop feedback control.

Figure 5:
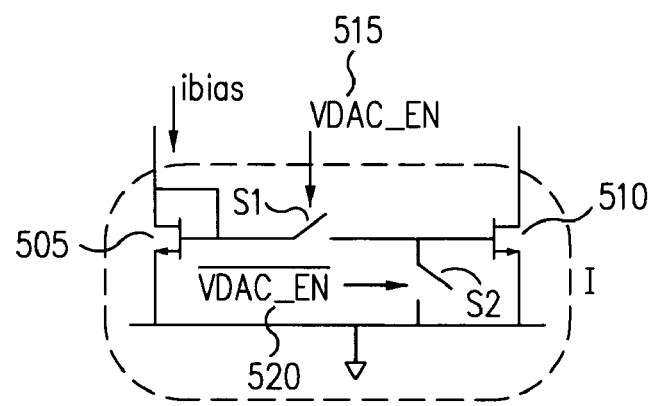
FIG. 5 is a high-level schematic for a second current source in the adder of FIG. 3.

A similar design may be used for the current source biasing the differential pair formed from transistors M3 and M4 as seen in FIG. 5 using matched, current-mirror configured MOSFETS 505 and 510. Should constraint be desired, a signal VDAC_EN 515 may be asserted. Because MOSFET 505 is biased to conduct a current of I, MOSFET 510 will also conduct I when signal VDAC_EN 515 is asserted. The drain of MOSFET 510 couples to the sources of M3 and M4 (FIG. 3) so that M3 are M4 are biased by current source I when the VDAC_EN signal 515 is asserted. Differential pair M3 and M4 may then respond to differential control voltage vdac by current steering as discussed above. Alternatively, a complement signal 520 may be asserted such that the effective coefficient is responsive to only the adaptive coefficient represented by differential control voltage vc. Conversely, both VDAC signal 515 and complement signal 421 may be asserted such that the effective coefficient is responsive to only the forcing coefficient represented by differential control voltage vdac. It will be appreciated, however, that the biasing of PMOS transistors 305 and 310 may be adjusted accordingly based upon whether the adaptive and forcing coefficients are active.

Figure 2:
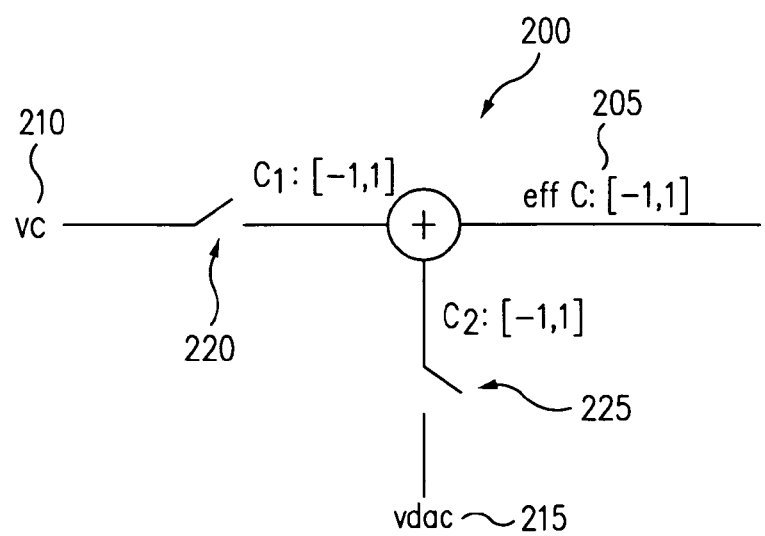
FIG. 2 is a conceptual block diagram for an adder configured to perform coefficient adaptation constraint according to one embodiment of the invention.
Figure 6:
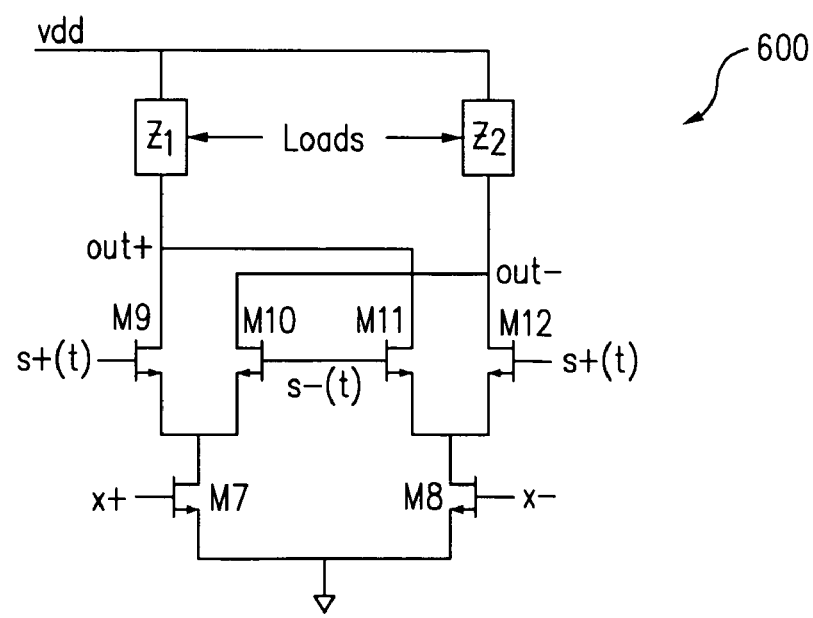
FIG. 6 is a schematic diagram of a four-quadrant multiplier for multiplying the constrained coefficient provided by the adder of FIGS. 2 and 3 with a signal to be equalized.

Having generated the effective coefficient as the current difference between nodes x+ and x−, it may then be used to multiply the signal to be equalized in one of the taps discussed with respect to FIG. 1. Turning now to FIG. 6, a schematic illustration of a four-quadrant multiplier 600 is illustrated. Multiplier 600 includes a differential pair of n-channel MOSFETs M7 and M8. These transistors are matched to transistors M5 and M6 and arranged in a current mirror configuration to transistors M5 and M6 such that M7 mirrors the current flowing into node x+ and M8 mirrors the current flowing into node x−. Thus, should both differential control voltages vc and vdac be in their default states, the current through M7 and M8 will be equal. The drain of M7 couples to the sources of n-channel MOSFETs M9 and M10 whereas the drain of M8 couples to the sources of n-channel MOSFETs M11 and M12. M9 and M10 form one differential pair biased by the differential input signal being equalized such that s+(t) biases the gate of M9 and s−(t) biases the gate of M10. M11 and M12 form another differential pair also biased by the differential input signal such that s+(t) biases the gate of M12 and s−(t) biases the gate of M11. The drains of M9 and M11 couple through a load Z1 to Vdd. Similarly, the drains of M10 and M12 couple through a load Z2 to Vdd, where Z2 and Z1 have substantially equal impedances. The differential output signal (for one tap) may then be taken between the drains of M9/M11 and M10/M12 and is represented by out+ and out−, respectively. Although each load Z1 and Z2 may comprise active devices, each load may be passive and formed from a resistive and inductive combination.

To adjust for temperature or process variations, multiplier 600 may be generalized as analogously discussed in co-assigned U.S. Ser. No. 10/724,449, the contents of which are incorporated by reference. For such a generalization, a plurality of multipliers such as multiplier 600 would have their out+ and out− nodes coupled in common. However, the transistors in a given multiplier would be chosen to have a certain width (or aspect ratio). For example, the transistors in one multiplier could have a width of n (n being an arbitrary value), another would have transistors of width 2n, another of 4n, and so on. In this fashion, by selectively combining the multipliers, the overall transconductance may be adjusted as necessary. For a given multiplier, transistors M7 and M8 would couple through switches to nodes x+ and x−, respectively. Should these switches be turned on, the selected multiplier will contribute to the output, thereby affecting the overall transconductance as desired. For example, upon manufacture, it may be determined whether a particular wafer has a fast or slow semiconductor process. If the particular process has affected the overall transconductance, the appropriate switches could be burned in to provide the desired effect on the transconductance. Alternatively, the switches could be formed through transistors such that they may be dynamically turned on or off in response to temperature variations. To turn off a particular multiplier, the switches coupling to nodes x+ and x− would be opened. Preferably, another set of switches would be provided so that the gates of transistors M7 and M8 could be grounded to isolate the particular multiplier. It will be appreciated that multiplier 600 may be used to perform the coefficient/signal multiplication in either portion 105 or 110.

As discussed herein, the constrained adaptation of coefficients in the feedforward equalizer portion 105 prevents the polarity inversion of the constrained coefficient, which in turn prevents the polarity inversion of the equalized output signal. A particularly efficient implementation of such constraint is as follows. As seen in FIG. 1, the feedforward equalizer portion will have an arbitrary number of taps, represented by the integer n. For a fractionally-spaced equalizer, the delay between taps (represented by the symbol $\tau_1$) will equal a fraction of the data rate period, denoted as T, such that $\tau_1$ equals T/m, where m is an arbitrary positive integer greater than 1 but typically ranging from 2 to 4. In general, the selection of m depends upon a tradeoff between channel correlation and spectral resolution as well as filter depth and the implementation complexity in realizing the center number of taps.

It may be shown that the center tap(s) (representing the present symbol being equalized) for a fractionally-spaced feedforward equalizer portion 105 equals the quantity (m−1). Given that there are n taps in total, the taps may be organized into a group of x taps that precede the center group of (m−1) taps followed by a group of y taps, where x and y are both positive integers such that n=x+y+(m−1). To minimize coefficient drift and the polarity-flip problem described above, the (m−1) center taps are constrained by having vdac kept at a bias of "1" and vc for the (m−1) center taps kept at a lower gain than the remaining taps in the x and y groups. Because feedforward equalizer portion 105 will generally address pre-cursor ISI whereas the feedback equalizer portion 110 will generally address post-cursor ISI, x should be greater than or equal to y to ensure that pre-cursor ISI is mitigated.

Although the coefficients in the feedback equalizer portion 110 need not be constrained to prevent a polarity inversion of the digital decisions 120 by slicer 115, these coefficients may still benefit from the present invention. That is because the feedback process driving the selection of the coefficients for the feedback equalizer portion 110 produces nominal negative values. To reduce the settling time for the closed adaptation of the coefficients for feedback equalizer portion 110, vdac may be set to a bias of 0.5 such that the effective coefficients will be constrained to range from +0.5 to −1.

Although the invention has been described with respect to particular embodiments, this description is only an example of the invention's application and should not be taken as a limitation. For example, although the previous embodiments incorporated MOSFETs, bipolar transistors could also be used. Moreover, n-channel devices could be replaced with p-channel devices and vice versa. Consequently, the scope of the invention is set forth in the following claims.

What is claimed is:

1. A constrained coefficient adder for adding an adaptive differential control voltage and a forcing differential control voltage, comprising:
    a first diode-connected transistor conducting current from a first node;
    a second diode-connected transistor conducting current from a second node;
    a first differential transistor pair, wherein current steering within the first differential pair of the current from the first current source is responsive to the adaptive differential control voltage; and
    a second differential pair, wherein current steering within the second differential pair of the current from the second current source is responsive to the forcing differential control voltage, and
    wherein the current steered by a first transistor in each of the first and second differential pairs is supplied by the first node, and wherein the current steered by a second transistor in each of the first and second differential pairs is supplied by the second node such that if the forcing differential control voltage steers all the current to either of the first or second transistors in the second differential pair a current difference between the current conducted by the first and second diode-connected transistors cannot change sign responsive to changes in the adaptive differential control voltage, the current difference representing the addition of the adaptive differential control voltage and the forcing differential control voltage.

2. The constrained coefficient adder of claim 1, further comprising:
    a first current source coupled to the first differential pair such that current conducted by the first differential pair is determined by the first current source; and
    a second current source coupled to the second differential pair such that current conducted by the second differential pair is determined by the second current source.

3. The constrained coefficient adder of claim 2, wherein the first current source and the second current source conduct a substantially equal current.

4. The constrained coefficient adder of claim 2, wherein the first current source comprises a first current mirror transistor coupled through a first switch to mirror the current in a second transistor, the first switch being responsive to an adaptive signal.

5. The constrained coefficient adder of claim 4, wherein the first current source further comprises a second switch coupled from a gate of the first current mirror transistor to ground, the second switch being responsive to the complement of the adaptive signal.

6. The constrained coefficient adder of claim 2, wherein the second current source comprises comprises a first current mirror transistor coupled through a first switch to mirror the current in a second transistor, the first switch being responsive to an forcing signal.

7. The constrained coefficient adder of claim 6, wherein the second current source further comprises a second switch coupled from a gate of the first current mirror transistor to ground, the second switch being responsive to the complement of the forcing signal.

8. The constrained coefficient adder of claim 1, wherein the first and second transistors in each of the first and second differential pairs are MOSFETs.

9. The constrained coefficient adder of claim 8, wherein the MOSFETs are n-channel MOSFETs.

10. The constrained coefficient adder of claim 8, wherein the MOSFETs are p-channel MOSFETs.

11. The constrained coefficient adder of claim 1, further comprising:
    a first bias transistor coupled to conduct current between the first diode-connected transistor and the first node; and
    a second bias transistor coupled to conduct current between the second-diode connected transistor and the second node, the first and second node being coupled to a power supply voltage.

12. The constrained coefficient adder of claim 1, further comprising:
    a four-quadrant multiplier configured to multiply the current difference between the first and second nodes with a differential input signal.

13. The constrained coefficient adder of claim 12, wherein the four quadrant multiplier includes a third differential pair of transistors, wherein a first transistor in the third differential pair is configured to mirror the current through the first diode-connected transistor and a second transistor in the third differential pair is configured to mirror the current the second diode-connected transistor.

14. The constrained coefficient adder of claim 13, further comprising:
    a fourth differential pair of transistor, wherein current steering within the fourth differential pair of the current from the first transistor in the third differential is responsive to the differential input voltage.

15. The constrained coefficient adder of claim 14, further comprising:
    a fifth differential pair of transistors, wherein current steering within the fifth differential pair of the current from the second transistor is responsive to the differential input voltage.

16. The constrained coefficient adder of claim 15, wherein the transistors in the fourth and fifth differential pairs are n-channel MOSFETs, and wherein the drains of the first transistor in each of the fourth and fifth differential pairs couples to a third node and the drains of the second transistor in each of the fourth and fifth differential pairs couples to a fourth node, wherein the output of the four-quadrant multiplier is provided by a voltage difference between the third and fourth nodes.

17. The constrained coefficient adder of claim 16, wherein the third node couples through a first reactive element to a power supply voltage, and wherein the fourth node couples through a second reactive element to the power supply voltage.

18. The constrained coefficient adder of claim 17, wherein the impedances of the first and second reactive elements are substantially equal.

19. A method for adding an adaptive differential control voltage and a forcing differential control voltage, comprising:

providing a first current to a first node;
providing a second current to a second node;
steering current from either the first node or the second node responsive to the adaptive differential control voltage, wherein if the adaptive differential control voltage is positive, current is steered from the first node and if the adaptive differential control voltage is negative, current is steered from the second node;
steering current from either the first node or the second node responsive to the forcing differential control voltage, wherein if the forcing differential control voltage is positive, current is steered from the first node and if the forcing differential control voltage is negative, current is steered from the second node;
conducting current that has not been steered from the first node through a first-diode connected transistor; and
conducting current that has not been steered from the second node through a second diode-connected transistor, wherein a difference between the currents through the first and second diode-connected transistors represents the addition of the differential control voltages.

20. The method of claim 19, wherein a maximum current steered responsive to the adaptive differential control voltage is limited to a first current, and wherein a maximum current steered responsive to the forcing differential control voltage is limited to a second current at least as large as the first current, whereby if the forcing differential control voltage steers the second current, the current difference between the current conducted by the first and second diode-connected transistors cannot change sign responsive to changes in the adaptive differential control voltage.

21. The method of claim 20, further comprising:
four-quadrant multiplying the current difference with a differential input signal.

* * * * *